Figure 1:
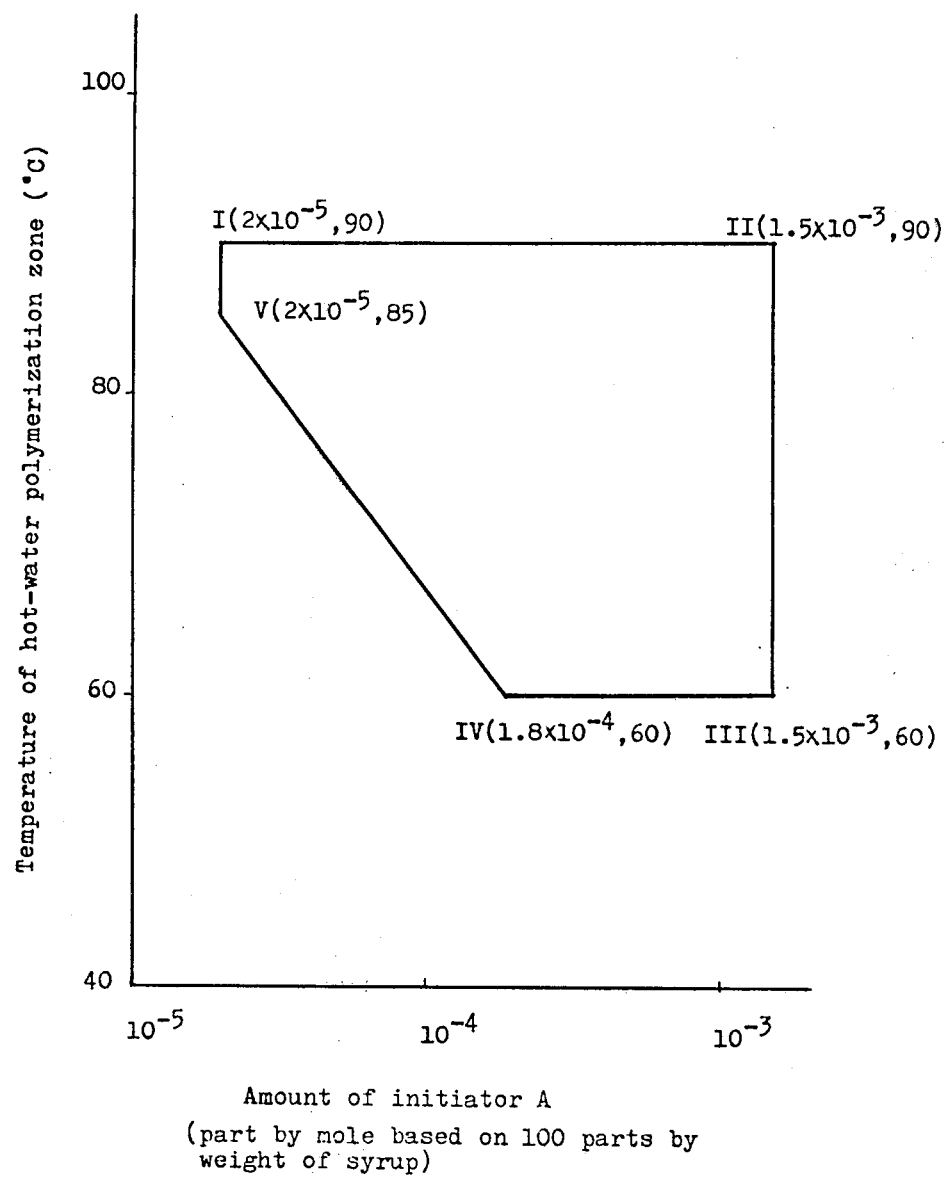

United States Patent [19]

Kato et al.

[11] 4,211,742

[45] Jul. 8, 1980

[54] PROCESS FOR THE CONTINUOUS CASTING OF LIQUID POLYMERIZABLE COMPOSITIONS

[75] Inventors: Yasuyuki Kato; Masahiko Moritani, both of Niihama, Japan

[73] Assignee: Sumitomo Chemical Company, Limited, Osaka, Japan

[21] Appl. No.: 865,180

[22] Filed: Dec. 28, 1977

[51] Int. Cl.$^2$ .............................................. B29D 7/02
[52] U.S. Cl. ................................ 264/216; 526/230.5; 526/319
[58] Field of Search ...................... 264/216; 526/230.5

[56] References Cited

U.S. PATENT DOCUMENTS

| | | | |
|---|---|---|---|
| 2,370,588 | 2/1945 | Strain | 526/230.5 |
| 2,464,062 | 3/1949 | Strain | 526/230.5 |
| 2,500,728 | 3/1950 | Williams | |
| 3,376,371 | 4/1968 | Opel et al. | 264/216 |
| 3,422,178 | 1/1969 | Junker et al. | 264/216 |
| 3,663,493 | 5/1972 | Miller | 264/216 |
| 3,829,531 | 8/1974 | Graff | 264/216 |
| 3,872,197 | 3/1975 | Kato et al. | 264/216 |
| 4,051,310 | 9/1977 | Lewis et al. | 526/230.5 |

FOREIGN PATENT DOCUMENTS

| | | |
|---|---|---|
| 824582 | 10/1969 | Canada . |
| 48-16713 | 5/1973 | Japan . |
| 48-16993 | 5/1973 | Japan . |
| 48-16994 | 5/1973 | Japan . |
| 1168083 | 10/1969 | United Kingdom . |
| 223326 | 11/1968 | U.S.S.R. ................................ 526/230.5 |

Primary Examiner—James B. Lowe
Attorney, Agent, or Firm—Birch, Stewart, Kolasch and Birch

[57] ABSTRACT

A continuous process for producing plate-like polymer articles which comprises subjecting a liquid polymerizable composition comprising a syrup of methyl methacrylate and a specified amount of a polymerization initiator of the formula:

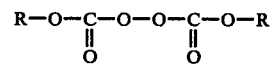

(in which R is a $C_4$–$C_{10}$ alkyl or alkoxyalkyl group), to a casting polymerization at a specified temperature. By this process, plate-like polymer articles having a high quality can be obtained in a very short polymerization time.

12 Claims, 5 Drawing Figures

PROCESS FOR THE CONTINUOUS CASTING OF LIQUID POLYMERIZABLE COMPOSITIONS

The present invention relates to a continuous process for producing plate-like methacrylic resin polymer articles by continuously feeding a liquid polymerizable composition prepared by dissolving a dialkyl peroxydicarbonate, which is a polymerization initiator, in a syrup of methyl methacrylate, into a space between two moving belts, and then polymerizing the composition.

A cell casting process using a pair of reinforced glass plates is known as a general process for producing methacrylic resin polymers having superior transparency, surface gloss and weatherability by polymerizing methyl methacrylate. However, this process is a batch system comprising cell assembling, feeding and cell disassembling, and hence, it is carried out almost manually, which results in an increase in labor and manufacturing cost. The rationalization of the process has therefore been investigated, and a continuous casting process has been developed as a substitute for the cell casting process and is now in practical use in industry.

The continuous casting process is disclosed, for example, in U.S. Pat. Nos. 2,500,728 and 3,872,197, British Pat. No. 1,168,083 and Canadian Pat. No. 824,582. This process comprises the steps of (1) feeding a polymerizable composition comprising methyl methcarylate and a polymerization initiator into a space between a pair of upper and lower moving endless belts; (2) in the course of travelling of the belts, polymerizing methyl methacrylate with hot water (the main polymerization) and subsequently completing the polymerization by heat treatment with hot air or a far infrared heater; and (3) taking out the produced plate-like polymer article from the other end of the belts. But, this process requires a high equipment cost which increases the manufacturing cost of methacrylic resin plate, and therefore there is an earnest desire for high-efficiency polymerization techniques which completes the polymerization in a short time.

In order to efficiently produce the desired methacrylic resin plates having a high commercial value by the continuous casting process, it is desirable to satisfy the following five requirements:

(1) When the produced plate-like polymer article has a thickness of 3 mm or less, the main polymerization time should be within 20 minutes, preferably within 15 minutes, and the heat treatment time should be within 10 minutes.

(2) Foams should not be produced in the plate-like polymer article during the main polymerization or heat treatment. In other words, the plate-like polymer article obtained should not include foams.

(3) The content of residual monomer in the plate-like polymer article obtained should be not more than 1.5% by weight. That is, the plate-like polymer article should have a high distortion temperature.

(4) The plate-like polymer article should be cementable by solvents and at the same time superior in solvent resistance.

(5) The plate-like polymer article obtained should not produce foams when heated at 180° C. for 30 minutes. In other words, foams should not be produced by heating.

As to (1), a high production efficiency is essential to the continuous casting process, because the polymerization equipment of the process requires a large investment.

As to (2), foams in the plate-like polymer article significantly lower the commercial value thereof, and therefore it is necessary to select proper polymerization conditions so as not to produce foams during the main polymerization or heat treatment.

As to (3), a residual monomer content exceeding 1.5% by weight is not desirable because the heat distortion temperature is lowered and the creep property becomes poor. It is therefore necessary to properly select the conditions for the heat treatment as well as the main polymerization in order to lower the residual monomer content.

As to (4), the plate-like methacrylic polymer article should be cementable by a solvent because it is necessary to cemented with a solvent such as dichloromethane in the processing of adhesion thereof. At the same time, the polymer should be superior in solvent resistance, because its commercial value is often damaged by occurrence of crazings owing to the solvent.

As to (5), the plate-like methacrylic polymer article is generally formed by bending techniques or vacuum forming techniques with heating, and therefore, when the polymer begins to produce foams at a low temperature, the foams included in the formed polymer lower the commercial value of the polymer article. Consequently, the plate-like polymer article should not produce foams when heated at 180° C. for 30 minutes.

In order to find the polymerization conditions satisfying the foregoing five requirements at the same time, the inventors have produced, under various polymerization conditions, plate-like methacrylic polymer articles having a thickness of, for example, 3 mm or less, using a polymerization initiator which is practically used in the continuous casting process, for example 2,2'-azobis(2,4-dimethylvaleronitrile) (hereinafter referred to as "ADVN") and lauroyl peroxide (hereinafter referred to as "LPO"). As a result, it was found that the requirements (2), (3), (4) and (5) could be satisfied at the same time by prolonging the main polymerization time to 30 to 40 minutes. But, when attempts were made to satisfy the requirement (1), in other words, to shorten the main polymerization time to within 20 minutes, preferably within 15 minutes, under the conditions wherein the plate-like polymer article of, for example, 3 mm or less in thickness is produced using ADVN or LPO, the following problems appeared: When the amount of ADVN or LPO was increased in order to shorten the main polymerization time, foams by polymerization were present in the produced plate-like polymer article, or the polymer produced foams by heating at temperatures lower than 180° C., and therefore, the desired plate-like polymer article having a satisfactory quality could not be obtained. Besides, when the same attempts were made by elevating the temperature of the hot-water polymerization zone in place of the increase of the amount of ADVN or LPO, foams by polymerization were also present in the produced plate-like polymer article, and therefore, no satisfactory plate-like polymer articles could be obtained, either. As described above, it was found that the five requirements could not be satisfied at the same time using the conventional polymerization initiators in the continuous casting process. Consequently, even though the thickness of the plate-like polymer was, for example, 3 mm or less, the total polymerization time necessary for the main polymerization and heat treatment could not be shortened to within 30 to 60 minutes, as is well known in Japanese Patent Publication Nos. 16713/1973, 16993/1973 and 16994/1973.

FIG. 1 graphically shows a relationship between the amount of dialkyl peroxydicarbonate (expressed in part by mole based on 100 parts by weight of syrup) and the temperature of the hot-water polymerization zone which is within the scope of the present invention.

Figure 2:
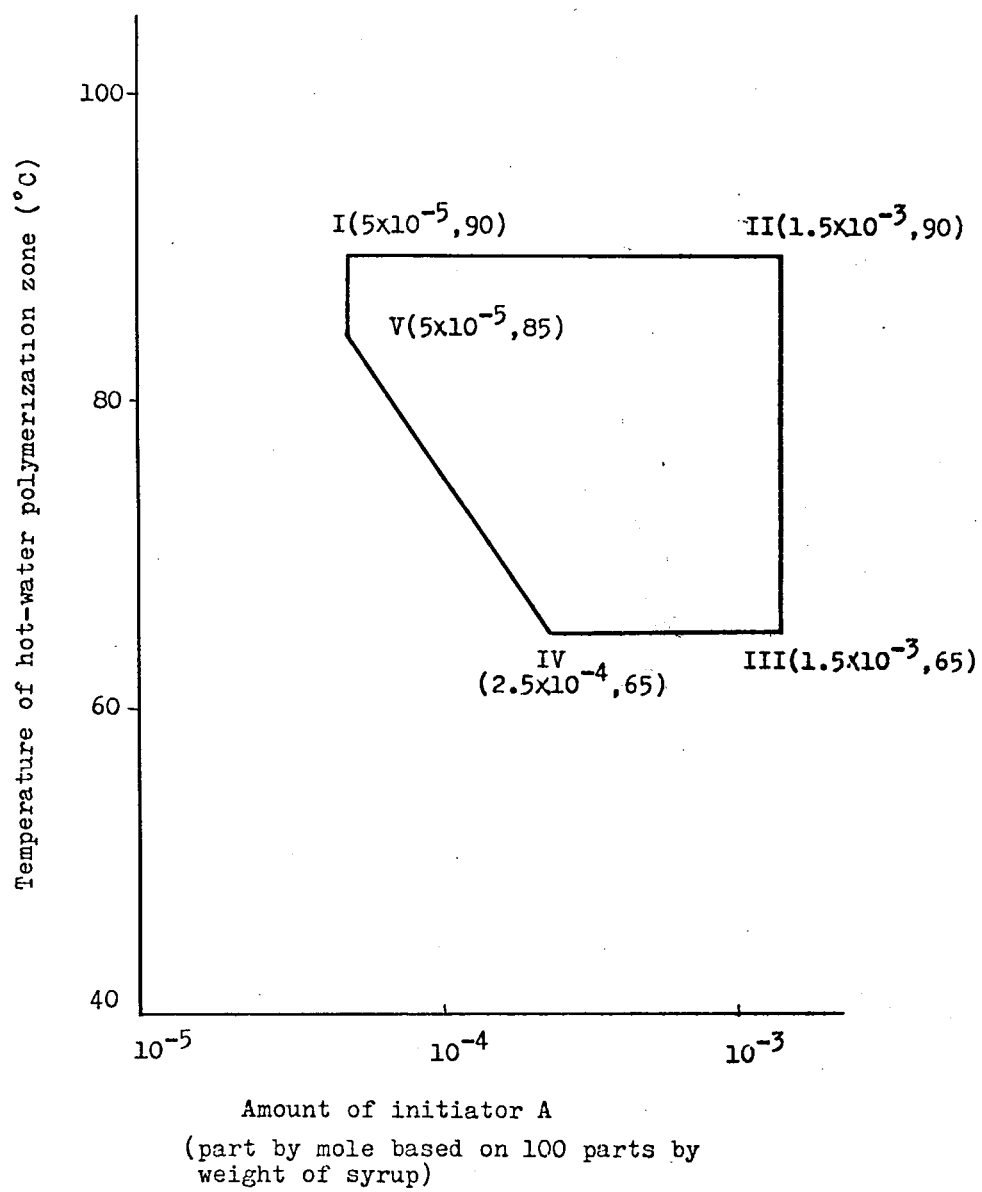
Figure 3:
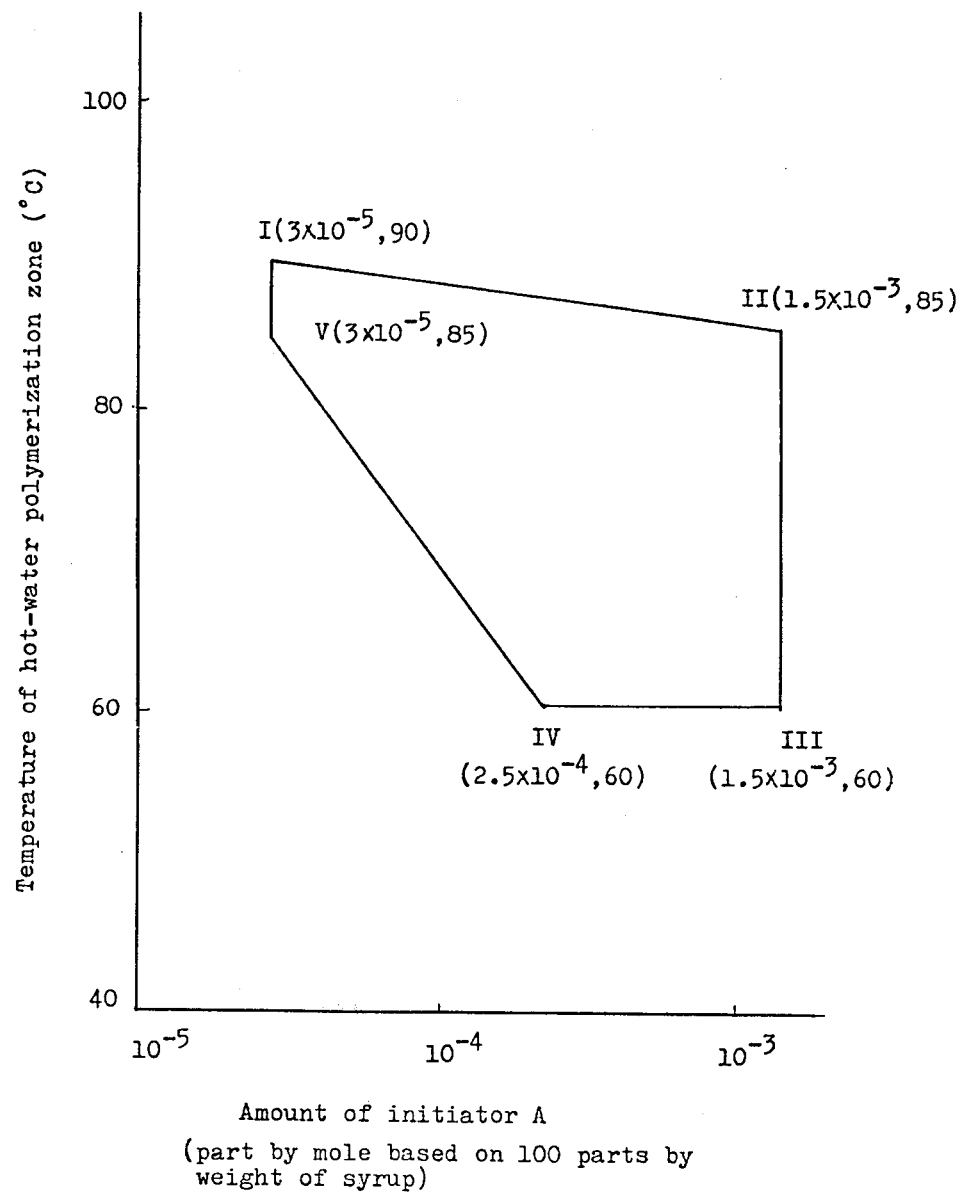
Figure 4:
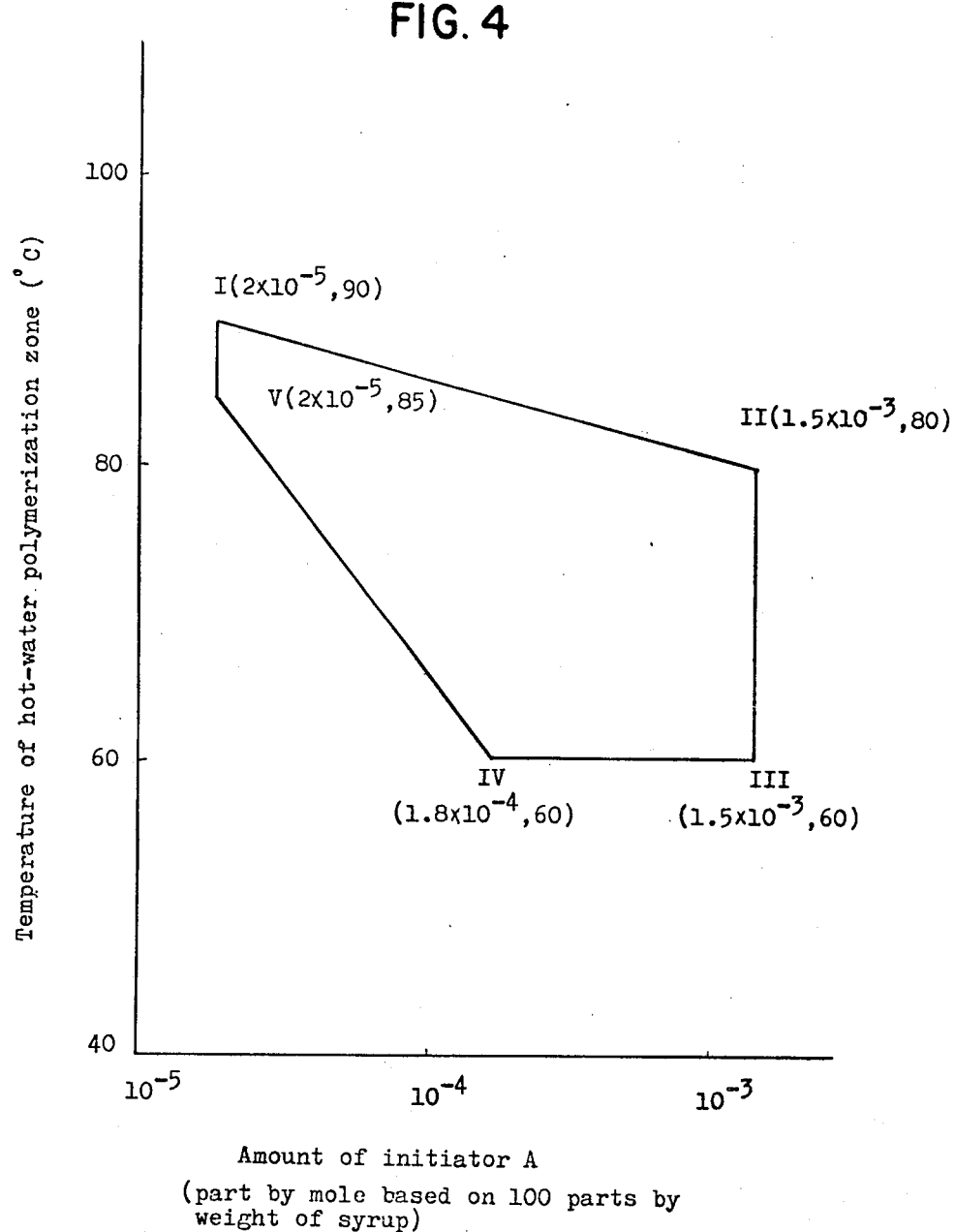

FIGS. 2 to 4 graphically show relationships between the amount of dialkyl peroxydicarbonate (expressed in part by mole based on 100 parts by weight of the syrup) and the temperature of hot-water polymerization zone which are desirable under certain conditions.

Figure 5:
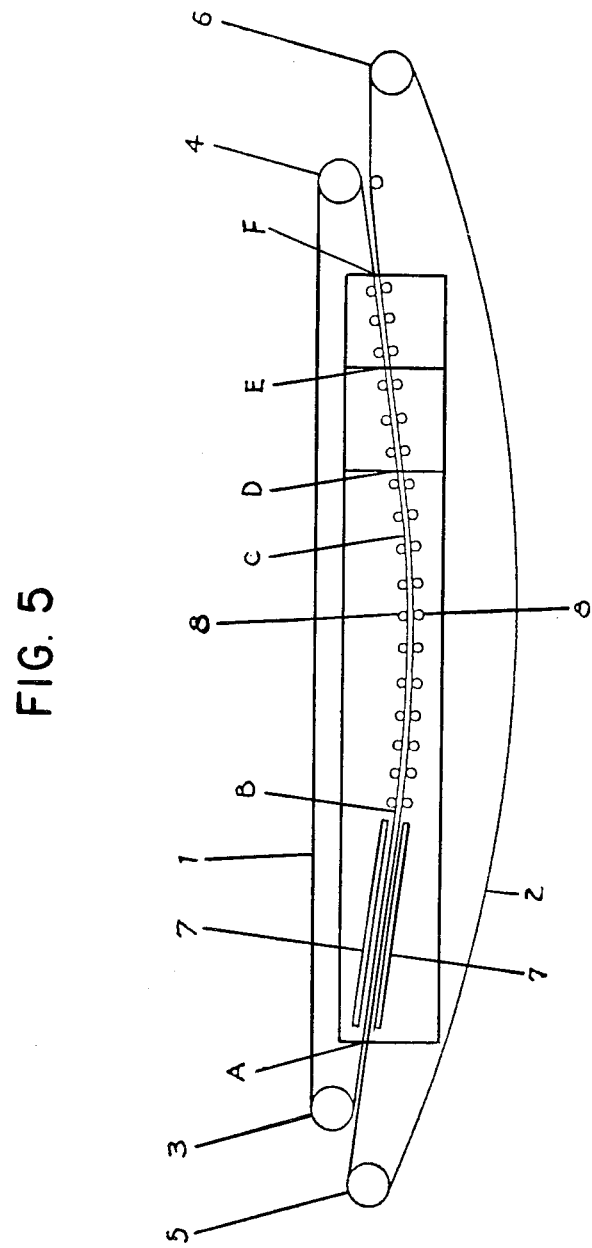

FIG. 5 shows a vertical sectional side view of a continuous polymerization equipment for carrying out the present invention, wherein 1 and 2 are moving belts, 3, 4, 5 and 6 are each a pulley, 7 is a support, 8 is a roller; and A to D is a hot-water polymerization zone, D to E is a heat treatment zone and E to F is a cooling zone.

An object of the present invention is to provide a continuous polymerization process satisfying the foregoing five requirements at the same time.

Another object of the present invention is to provide a continuous casting process for producing plate-like polymer articles which are low in cost and superior in quality.

A further object of the present invention is to provide a continuous casting process for producing plate-like methacrylic polymer articles in a high efficiency which comprises feeding a liquid polymerizable composition, which is prepared by dissolving a dialkyl peroxydicarbonate as a polymerization initiator in a syrup of methyl methacrylate having a polymer content of 15 to 35% by weight, into a space between a pair of moving belts, and then polymerizing the composition.

Other objects and advantages will become apparent from the following description.

According to the present invention, there is provided a continuous polymerization process characterized by continuously feeding a liquid polymerizable composition, which is prepared by dissolving a polymerization initiator of the formula:

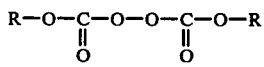

in which R is an alkyl or alkoxyalkyl group having 4 to 10 carbon atoms (hereinafter, referred to as "initiator A"), in a syrup of methyl methacrylate having a polymer content of 15 to 35% by weight, into a space enclosed with a pair of upper and lower moving endless belts and continuous gaskets between the belts, both of said belts travelling in the same direction at the same speed and said gaskets being arranged at each side of the belt at least one by one (i.e., in an opposing relationship) and travelling in intimate contact with both belts, driving or running the belts through a hot-water polymerization zone thereby to polymerize the composition, at which both the amount of the initiator A (expressed in part by mole based on 100 parts by weight of the syrup) and the temperature (°C.) of the zone are present within the region enclosed with straight lines passing through the five points in FIG. 1, i.e., I $(2 \times 10^{-5}, 90)$, II $(1.5 \times 10^{-3}, 90)$, III $(1.5 \times 10^{-3}, 60)$, IV $(1.8 \times 10^{-4}, 60)$ and V $(2 \times 10^{-5}, 85)$, driving or running the belts through a heat treatment zone thereby to complete the polymerization and then taking out the plate-like polymer article at the other end of the belt.

Furthermore, according to the present invention, the main polymerization time can be shortened as follows depending upon the thickness of the plate-like polymer article: within 20 minutes with a thickness of 3 mm or less; within 25 minutes with a thickness of more than 3 to 4 mm; and within 30 minutes with a thickness of more than 4 to 6 mm. Further, the content of residual monomer can be reduced to 1.5% by weight or less in a short heat treatment time.

The syrup of which the main ingredient is methyl methacrylate, in the present invention, has a polymer content of 15 to 35% by weight, preferably 20 to 30% by weight. The viscosity of the syrup is preferably 5 poises or more at 25° C. When the polymer content in the syrup is lower than 15% by weight, the production efficiency of the plate-like polymer article becomes poor. For example, the desired high-quality plate-like methacrylic polymer article can hardly be produced within 20 minutes of the main polymerization time when the thickness of the plate is 3 mm of less. Consequently, it is impossible to further shorten the main polymerization time to 15 minutes or shorter. Besides, when the polymer content is more than 35% by weight, the viscosity of the syrup becomes so high that it becomes difficult to feed the syrup into the space between a pair of moving belts. The viscosity of the syrup is preferably 5 poises or more at 25° C. The syrup having a viscosity of less than 5 poises tends to produce foams by polymerization when the main polymerization time is shortened. Moreover, the quality of the produced plate-like polymer article becomes poor, and the temperature at which foaming by heating begins becomes lower.

On the other hand, when the viscosity becomes high, the syrup is hardly fed into said space. Consequently, the upper limit of the viscosity is 100 poises in general. That is to say, a preferred syrup has a polymer content of 15 to 35% by weight and a viscosity of 5 to 100 poises at 25° C.

The syrup used in the present invention may contain monomers copolymerizable with methyl methacrylate other than methyl methacrylate which is the main ingredient in the syrup unless the content of the monomer is over 30% by weight based on the total weight of the syrup. The other monomers include $C_2-C_8$ alkyl esters of methacrylic acid, styrene and its halogen or alkyl derivatives, vinyl acetate, acrylonitrile and its derivatives, $C_1-C_8$ alkyl esters of acrylic acid and the like. Among them, the alkyl esters of acrylic acid are particularly preferred, in order to elevate the temperature at which foaming by heating begins when shortening of the main polymerization time is the primary objective.

Suitable examples of the $C_1-C_8$ alkyl esters of acrylic acid are methyl acrylate, ethyl acrylate, n-propyl acrylate, isopropyl acrylate, n-butyl acrylate, isobutyl acrylate, sec-butyl acrylate, tert-butyl acrylate, hexyl acrylate, cyclohexyl acrylate, 2-ethylhexyl acrylate and octyl acrylate. Among them, methyl acrylate and ethyl acrylate are particularly preferred.

The alkyl esters of acrylic acid are effectively used in an amount of 0.5 to 15% by weight based on the total weight of the syrup. Further, it has unexpectedly been found that the alkyl esters of acrylic acid can reduce the content of residual monomer in the plate-like polymer article to 1.5% by weight or less in a shorter heat treatment time.

Further, in the present invention, the syrup may optionally contain various additives, such as thermal stabilizers, ultraviolet absorbers, coloring agents, plasticizers, mold releasing agents and fillers in such an amount that any undesirable effect is not given on the objects of the present invention.

In order to prepare the methyl methacrylate syrup used in the present invention which has a polymer content of 15 to 35% by weight, the following procedures are taken:

(I) Methyl methacrylate or a mixture of methyl methacrylate and the foregoing monomers copolymerizable with methyl methacrylate and/or the foregoing additives and fillers is partially polymerized so as to give the required polymer content and components.

(2) Methyl methacrylate or said mixture is partially polymerized, and then said monomer and/or said additives and fillers are added thereto so as to give the required polymer content and components.

(3) Said monomer or said mixture is polymerized, and the resulting polymer is then dissolved in methyl methacrylate or a mixture of methyl methacrylate, said other copolymerizable monomers and/or said additives and fillers so as to give the required polymer content and components.

Suitable examples of the initiator A used in the present invention are di-n-butyl peroxydicarbonate, diisobutyl peroxydicarbonate, di-sec-butyl peroxydicarbonate, dicyclohexyl peroxydicarbonate, di-2-ethylhexyl peroxydicarbonate, di-ethoxyethyl peroxydicarbonate, di-3-methoxybutyl peroxydicarbonate and bis(4-tert-butylcyclohexyl) peroxydicarbonate, which may be used alone or in a mixture of two or more thereof. Among them, di-sec-butyl peroxydicarbonate and bis(4-tert-butylcyclohexyl) peroxydicarbonate are preferred. Furthermore, from the standpoint of easy handling and safe operation, a plasticizer and a diluent, which are hardly reactive with the initiator A, may be used together with the initiator A in an amount of not larger than 10 times by weight based on the initiator A. The plasticizer includes, for example, dibutyl phthalate, dioctyl phthalate and the like. The diluent includes, for example, mineral spirits, toluene and the like.

The suitable range of the amount of the initiator A and the temperature of the hot-water polymerization zone should properly be determined so that both the amount (expressed in part by mole based on 100 parts by weight of the syrup) and the temperature (°C.) are present at the same time within the region enclosed with straight lines passing through the five points in FIG. 1, i.e., I ($2\times10^{-5}$, 90), II ($1.5\times10^{-3}$, 90), III ($1.5\times10^{-3}$, 60), IV ($1.8\times10^{-4}$, 60) and V ($2\times10^{-5}$, 85). In this way, the above described five requirements are satisfied at the same time and the objective plate-like polymer articles can be obtained.

In general, when the final plate-like polymer article has a larger thickness, foaming by polymerization occurs more easily owing to the polymerization heat. Consequently, a preferred region within the amount-temperature region in FIG. 1 is such that the amount is small and at the same time the temperature is low. This means that when the thickness of the polymer article is smaller, the polymerization can be carried out with less occurrence of the foaming by polymerization heat and at a higher polymerization rate.

Thus, the preferred polymerization condition varies within the region in FIG. 1, depending upon the thickness of the plate-like polymer article as follows:

(1) When the thickness is 3 mm or less, the preferred condition is such that the amount of initiator A (expressed in part by mole based on 100 parts by weight of the syrup) and the temperature of hot-water polymerization zone are present at the same time within the region enclosed with the straight lines passing through the five points in FIG. 2, i.e., I ($5\times10^{-5}$, 90), II ($1.5\times10^{-3}$, 90), III ($1.5\times10^{-3}$, 65), IV ($2.5\times10^{-4}$, 65) and V ($5\times10^{-5}$, 85).

(2) When the thickness is more than 3 mm but is not more than 4 mm, the preferred condition is such that said amount of initiator A expressed in part by mole and said temperature are present at the same time within the region enclosed with the straight lines passing through the five points in FIG. 3, i.e., I ($3\times10^{-5}$, 90), II ($1.5\times10^{-3}$, 85), III ($1.5\times10^{-3}$, 60), IV ($2.5\times10^{-4}$, 60) and V ($3\times10^{-5}$, 85).

(3) When the thickness is more than 4 mm but is not more than 6 mm, the preferred condition is such that said amount of initiator A expressed in part by mole and said temperature are present at the same time within the region enclosed with the straight lines passing through the five points in FIG. 4, i.e., I ($2\times10^{-5}$, 90), II ($1.5\times10^{-3}$, 80), III ($1.5\times10^{-3}$, 60), IV ($1.8\times10^{-4}$, 60) and V ($2\times10^{-5}$, 85).

In FIGS. 1 to 4, the straight lines I-II show an upper border line of said temperature correlative to said amount of initiator A, at a higher zone of which foams by polymerization are produced in the plate-like polymer article. The straight lines II-III show an upper border line of said amount of initiator A, in a larger amount than that at which the plate-like polymer article produces foams when it is heated at 180° C. for 30 minutes. The straight lines III-IV, IV-V and V-I show a lower border line of said temperature correlative to said amount of initiator A at a lower zone of which the objective plate-like polymer article can not be obtained within the intended main polymerization time. By these straight lines I-II, II-III, III-IV, IV-V and V-I in FIGS. 1 to 4, the enclosed region showing the relationship between said amount and said temperature is formed. When the polymerization condition is within this region, the plate-like polymer article satisfying all the above-described five requirements can easily be obtained by polymerizing the liquid polymerizable composition of the present invention. In FIGS. 1 to 4, the amount of the initiator A is expressed in the logarithmic scale.

Furthermore, when the main polymerization of the present liquid polymerizable composition is carried out under the condition that both the amount of initiator A and the temperature of the hot-water polymerization zone are present at the same time within the region in FIG. 1, and then the heat treatment is carried out at 110° to 115° C., the content of residual monomer in the plate-like polymer article is reduced to 1.5% by weight or less in a very short time. Thus, the desired plate-like polymer articles having a high heat distortion temperature and high solvent resistance can be obtained.

In order to further reduce the content of residual monomer, other polymerization initiators than the initiator A may optionally be used together with the initiator A in an amount within the range wherein the temperature at which the plate-like polymer article finally obtained begins to foam by heating is now lowered to less than 180° C. and wherein the foaming by polymerization does not occur. The amount of the other initiator used together with the initiator A is usually $2\times10^{-4}$ part by mole or less based on 100 parts by weight of the syrup.

As the other initiators, conventional radical initiators are used. Among them, however, lauroyl peroxide and tert-butyl peroxypivalate are particularly preferred in order to further reduce the content of residual monomer, to keep said temperature at which the foaming by heating begins above 180° C. and to prevent the occurrence of foaming during polymerization.

The production equipment used in the present invention is generally well known as a double-belt conveyer. The objective plate-like polymer articles can be obtained by operating this equipment as follows.

A pair of upper and lower endless belts are moved in the same direction at the same speed. At least one continuous gasket is arranged between both belts at each side of the belt and moved in intimate contact with both belts. Thus, a space enclosed by both belts and said gaskets is formed between the belts. Said liquid polymerizable composition of the present invention is continuously fed into this space, and polymerized by driving or running the belts through the hot-water polymerization zone and the heat treatment zone. The produced plate-like polymer article is continuously taken out at the opposite end.

This equipment has the following mechanisms: The first is a mechanism to keep the intimate contact between the belts and the gaskets and at the same time to adjust the distance between the belts to the required thickness of the plate-like polymer and to maintain this distance; and the second is a mechanism to flexibly follow the change of volume caused by the polymerization of the liquid polymerizable composition.

As the material for the moving belt, metallic endless bands such as steel or stainless steel endless bands are desirable. These metallic bands may be laminated with a plastic film thereon. When the plastic film has a pattern surface, the surface of the produced plate-like polymer article can be marked with the pattern. When a metallic band is used, the thickness of the band is 0.1 to 3 mm, preferably 0.5 to 2 mm.

In polymerizing said liquid polymerizable composition, the moving belts including the composition are driven through a heating zone wherein they are heated from the outside. The heating zone is divided into a hot-water polymerization zone and a heat treatment zone. In the former zone, a shower of hot water is applied onto the moving belts or the belts are driven through a hot water bath. The temperature of the hot water may be constant throughout the zone, or may be changed stepwise or continuously. The liquid polymerizable composition is polymerized while being passed through the hot-water polymerization zone together with the moving belts, whereby the degree of polymerization reaches 80 to 95% by weight in general. The unpolymerized portion of the composition is polymerized in the subsequent heat treatment zone. Since the polymerization of the composition is almost achieved in the hot-water polymerization zone, the polymerization in this zone is generally called the "main polymerization".

Said liquid polymerizable composition is passed together with the moving belts from the hot-water polymerization zone to the heat treatment zone. In the latter zone, the moving belts are heated from the outside by hot air or a far infrared heater. The heat treatment temperature may be constant throughout the zone or may be changed stepwise or continuously. The polymerization of the composition is substantially completed before the composition comes out of the heat treatment zone.

As described above, the liquid polymerizable composition is fed into the space between a pair of moving belts and passed together with the belts through the hot-water polymerization zone and heat treatment zone during which the polymerization of the composition is substantially completed. And, the produced plate-like polymer article is taken out at the other end of the moving belts. In this case, it is desirable to set a cooling zone next to the heat treatment zone for the purpose of cooling the plate-like polymer article prior to the removal thereof. It is desirable that the polymer be cooled to less than 100° C., preferably less than 90° C., before it is removed. In order to cool the polymer, the moving belts may be applied with a shower of cold water, exposed to cold air or allowed to cool to room temperature.

An embodiment of the production equipment used in the present invention will be illustrated specifically with reference to the drawing (FIG. 5).

In FIG. 5, tension is applied to endless belts 1 and 2 by one set of pulleys 3 and 4, and another set of pulleys 5 and 6, respectively. The pulleys 4 and 6 are driven at the same peripheral speed to cause the endless belts 1 and 2 to travel, respectively. The liquid polymerizable composition and gaskets are continuously fed at the opening between the pulleys 3 and 5 which are arranged at one end. The produced plate-like polymer article is taken out at the opening between the pulleys 4 and 6 which are arranged at the other end.

In FIG. 5, the lower endless belt is longer than the upper one, and there are shown the positions of a hot-water polymerization zone, a heat treatment zone and a cooling zone which are arranged between point A (starting point of the main polymerization) and point F (end point of the cooling zone). That is to say, the zone between points A and D is the hot-water polymerization zone, the zone between points D and E is the heat treatment zone and the zone between points E and F is the cooling zone. The endless belts 1 and 2 travel through these zones in the order described above. The position of point A is higher than that of point B, and the endless belts 1 and 2 travel down straight and obliquely from point A to point B, and travel over in a concavely curved line from point B to point C. The position of point F is higher than that of point C, and the endless belts travel up straight and obliquely from point C to point F.

The upper and lower endless belts are held by a non-rotating support 7 having a frame structure from point A to point B, whereby the distance between both belts is kept at a required length. Both of the belts are held by a group of rollers 8 from point B to point F, and thereby, the belts can easily be adjusted to the change of volume of the liquid polymerizable composition.

A specific embodiment of the production equipment used in the present invention is described above, but the production equipment is not limited thereto. The present invention can of course be applied to those which are conventionally known as a production equipment for the continuous casting process. For example the paths of a pair of upper and lower belts between the feed inlet (at which the liquid polymerizable composition is supplied to a space between the belts) and the outlet (at which the produced plate-like polymer is taken out) may be horizontal, inclined in a straight line, or curved spontaneously. Further, an equipment to hold a definite amount of said composition may be provided at said feed inlet.

As the gasket used in the present invention, plastic string is generally employed. As the plastics, flexible plastics, such as plasticized polyvinyl chloride, polyethylene, polypropylene, ethylene-vinyl acetate copolymer, ethylene-propylene rubber, natural rubber and other rubbers are used. Among them, plasticized polyvinyl chloride is usually used, and plasticized polyvinyl chloride comprising 100 parts by weight of polyvinyl chloride and 80 to 170 parts by weight of a plasticizer (e.g. dioctyl phthalate) is particularly useful. The cross section of the gasket may be a square, rectangle or circle, but generally hollow gaskets like a pipe are preferred.

The present invention is illustrated by the following examples, but is not limited thereto. Percentages in the examples are by weight, unless specified otherwise.

The tests in the examples were carried out as follows: Heat distortion temperature was measured according to JIS K 6718. Foaming by polymerization was judged by visual observation of the presence or absence of foams included in the produced plate-like polymer article. Foaming by heating was judged by heating the plate-like polymer article at 180° C. for 30 minutes in a circulation-type hot air oven and visually observing the presence or absence of foams produced in the polymer. Reduced viscosity was measured on a 0.1% chloroform solution of the polymer at 25° C. Residual monomer content was measured by subjecting a solution of the polymer in methylene chloride to gas-liquid chromatography.

EXAMPLE 1

The polymerization is carried out using the continuous polymerization equipment shown in FIG. 5. The equipment is constructed as follows: Upper and lower stainless steel endless belts of 500 mm in width and 0.6 mm in thickness have a mirror-polished surface. The horizontal distance between point A (starting point of hot-water polymerization) and point B is 2,900 mm and, the path between the two points is straight and inclined by an angle of 3° to the horizontal. Both belts are held by a non-rotating support having a frame structure. The horizontal distance between points B and C is 2,240 mm, the path between the two points is concavely curved at a radius of curvature of 25,423 mm, and both belts are held by rollers from point B to point C. The horizontal distance between points C and F is 4,860 mm, the path between the two points is straight and inclined by an angle of 2.1° to the horizontal, and both belts are held by rollers from point C to point F. The horizontal distance between points A and F is 10,000 mm and is divided into three zones: The first zone (A-D, 6,240 mm) is a hot-water polymerization zone wherein hot water of 85° C. is showered for heating, the second zone (D-E, 2,670 mm) is a heat treatment zone wherein hot air of 120° C. is passed for heating and the third zone (E-F, 1,090 mm) is a cooling zone wherein cold air is passed for cooling.

A liquid polymerizable composition and a pipe-like plasticized polyvinyl chloride containing 55% of dioctyl phthalate are continuously supplied to a space between both belts at the feed inlet of the A side. Said composition is prepared as follows: A mixture of methyl methacrylate containing 3% of ethyl acrylate and 0.001% of azobisisobutyronitrile is polymerized at 80° C. to obtain a syrup having a viscosity of 13 poises at 25° C. and a polymer content of 20%; 0.3% of bis(4-tert-butylcyclohexyl) peroxydicarbonate is dissolved in the resulting syrup (the said syrup contains said peroxydicarbonate of $0.75 \times 10^{-3}$ part by mole based on 100 parts by weight of the syrup); and the resulting syrup is deaerated under reduced pressure.

Initial tensions of 5 kg/mm$^2$ and 4 kg/mm$^2$ are applied to the upper and lower belts, respectively, and both belts are driven at a speed of 545 mm/min. The distance between both belts in the zone A-B is adjusted so that the produced plate-like polymer article has a thickness of 3 mm. The syrup is polymerized by passing it through the hot-water polymerization zone and heat treatment zone, cooled in the cooling zone and taken out at the other end of the belts. The product is a plate-like, transparent polymethyl methacrylate article of about 3 mm in thickness, and no foaming occurs during polymerization. Polymerization times in the hot-water polymerization zone and heat treatment zone are very short, and they are 11.4 minutes and 4.9 minutes, respectively.

The resulting product has the following properties: a reduced viscosity of 1.35 dl/g, a residual monomer content of 0.43%, a heat distortion temperature of 102° C. with no foaming by heating, and no change is observed on the surface even when the product is exposed to ethyl acetate vapor for 1 hour.

EXAMPLE 2

Polymerization of a syrup is carried out by using the equipment as used in Example 1. The syrup is preapred as follows: A mixture of methyl methacrylate containing 3% of ethyl acrylate and 0.001% of azobisisobutyronitrile is polymerized at 80° C. to obtain a syrup having a viscosity of 7 poises at 25° C. and a polymer content of 15%; 0.45% of bis(4-tert-butylcyclohexyl) peroxydicarbonate is dissolved in the resulting syrup (said syrup contains said peroxydicarbonate of $1.13 \times 10^{-3}$ part by mole based on 100 parts by weight of the syrup); and the resulting syrup is deaerated under reduced pressure. In the polymerization, the temperature of the heat treatment zone is kept at 120° C., but the temperature of the hot-water polymerization zone and the speed of the belts are changed from those in Example 1. The results are shown in Table 1.

Table 1

| Speed of belt (mm/min) | Hot-water polymerization zone | | Reduced viscosity (dl/g) | Residual monomer (%) | Heat distortion temperature (°C.) |
| --- | --- | --- | --- | --- | --- |
| | Temp. (°C.) | Time (min) | | | |
| 567 | 85 | 11.0 | 1.0 | 0.48 | 100 |
| 488 | 80 | 12.8 | 1.0 | 0.47 | 100 |

The resulting products are a plate-like, transparent polymethyl methacrylate article having a thickness of about 3 mm and no foaming occurs during polymerization irrespective of the short polymerization time. Further, they produce no foaming by heating.

EXAMPLE 3

Polymerization of a syrup is carried out by supplying the syrup to the equipment in Example 1 wherein the temperatures of the hot-water polymerization zone and heat treatment zone are 85° C. and 125° C., respectively. The syrup is prepared as follows: A mixture of methyl methacrylate containing a suitable amount of 2-ethylhexyl acrylate or butyl acrylate and 0.001% of azobisisobutyronitrile is polymerized at 80° C. to obtain a syrup having a viscosity of 20 poises at 25° C. and a polymer content of 25%, 0.3% of bis(4-tert-butylcyclohexyl) peroxydicarbonate is dissolved in the resulting syrup (said syrup contains said peroxydicarbonate of $0.75 \times 10^{-3}$ part by mole based on 100 parts by weight of the syrup); and the resulting syrup is deaerated under reduced pressure. The results are shown in Table 2.

Methyl methacrylate containing 5% of ethyl acrylate is added to the polymerization reactor, and 0.1% of 2,2'-azobis(2,4-dimethylvaleronitrile) is added thereto at 90° C. The mixture is polymerized under reflux to obtain a syrup having a viscosity of 40 poises at 25° C. and a polymer content of 30%.

A suitable amount of bis(4-tert-butylcyclohexyl) peroxydicarbonate is dissolved in each of the syrups obtained above, followed by deaeration under reduced pressure. Polymerization is carried out by supplying the deaerated syrup to the equipment as used in Example 1

Table 2

| Amount of 2-ethylhexyl acrylate or butyl acrylate in syrup (%) | | Speed of belt (mm/min) | Hot-water polymerization zone (min) | Reduced viscosity (dl/g) | Residual monomer (%) | Heat distortion temperature (°C.) |
|---|---|---|---|---|---|---|
| 2-Ethylhexyl acrylate | 3 | 612 | 10.2 | 1.24 | 0.88 | 98 |
|  | 7 | 643 | 9.7 | 1.17 | 0.80 | 87 |
| Butyl acrylate | 3 | 678 | 9.2 | 1.14 | 0.58 | 97 |
|  | 7 | 637 | 9.8 | 1.11 | 0.44 | 90 |

The resulting products are a plate-like, transparent polymethyl methacrylate article having a thickness of about 3 mm and no foaming occurs during polymerization irrespective of the short polymerization time. Further, they produce no foaming by heating.

EXAMPLE 4

Production of syrup 4-1:

wherein the temperature of the hot-water polymerization zone and heat treatment zone are changed from those in Example 1. The results are shown in Table 3.

The resulting products are a plate-like, transparent polymethyl methacrylate article having a thickness of about 3 mm and no foaming occurs during polymerization irrespective of the short polymerization time. Further, they produce no foaming by heating.

Table 3

| Syrup No. | Bis(4-tert-butylcyclohexyl) peroxydicarbonate | | Speed of belt (mm/min) | Hot-water polymerization zone | | Heat treatment zone | | Reduced viscosity (dl/g) | Residual monomer (%) | Heat distortion temperature (°C.) |
| | (%) | Part by mole based on 100 parts by weight of syrup | | Temp. (°C.) | Time (min) | Temp. (°C.) | Time (min) | | | |
|---|---|---|---|---|---|---|---|---|---|---|
|  | 0.4 | $1.01 \times 10^{-3}$ | 834 | 85 | 7.5 | 130 | 3.2 | 0.95 | 0.43 | 100 |
| 4-1 | 0.3 | $0.75 \times 10^{-3}$ | 693 | 85 | 9.0 | 125 | 3.9 | 1.21 | 0.75 | 98 |
|  | 0.15 | $0.38 \times 10^{-3}$ | 520 | 85 | 12.0 | 120 | 5.1 | 1.90 | 0.66 | 99 |
|  | 0.4 | $1.01 \times 10^{-3}$ | 543 | 75 | 11.5 | 120 | 4.9 | 1.16 | 0.56 | 100 |
| 4-2 | 0.1 | $0.25 \times 10^{-3}$ | 446 | 80 | 14.0 | 120 | 6.0 | 2.30 | 0.73 | 104 |
|  | 0.08 | $0.20 \times 10^{-3}$ | 462 | 85 | 13.5 | 120 | 5.8 | 2.30 | 0.77 | 104 |
| 4-3 | 0.3 | $0.75 \times 10^{-3}$ | 891 | 85 | 7.0 | 130 | 3.0 | 1.10 | 0.41 | 97 |
|  | 0.45 | $1.13 \times 10^{-3}$ | 520 | 70 | 12.0 | 120 | 5.1 | 1.35 | 0.40 | 97 |

To a polymerization reactor equipped with a reflux condenser, nitrogen-introducing tube, thermometer and stirrer is added methyl methacrylate containing 3% of ethyl acrylate. After the atmosphere in the reactor is replaced with nitrogen gas, the monomer is heated at 90° C. with stirring and 0.08% of 2,2'-azobis(2,4-dimethylvaleronitrile) is added thereto. Elevation of the temperature owing to polymerization heat is immediately observed. The reaction mixture is kept at 100° to 102° C. under reflux for 10 minutes and then cooled. The syrup thus obtained has a viscosity of 20 poises at 25° C. and a polymer content of 25%.

Production of syrup 4-2:

Methyl methacrylate is added to the polymerization reactor, and 0.1% of 2,2'-azobis(2,4-dimethylvaleronitrile) is added thereto at 90° C. The mixture is polymerized under reflux to obtain a syrup having a viscosity of 40 poises at 25° C. and a polymer content of 30%.

Production of syrup 4-3:

EXAMPLE 5

Methyl methacrylate is added to the polymerization reactor as used in Example 4, and 0.08% of 2,2'-azobis(2,4-dimethylvaleronitrile) is added thereto at 90° C. The mixture is polymerized under reflux to obtain a syrup having a viscosity of 20 poises at 25° C. and a polymer content of 25%.

In the syrup are dissolved 0.03% of lauroyl peroxide and 0.15% of bis(4-tert-butylcyclohexyl) peroxydicarbonate (the resulting syrup contains said peroxydicarbonate of $0.38 \times 10^{-3}$ part by mole based on 100 parts by weight of the syrup), followed by deaeration under reduced pressure. The deaerated syrup is supplied to the equipment as used in Example 1, and polymerization is carried out by driving the moving belts at a speed of 529 mm/min, during which the hot-water polymerization zone and heat treatment zone are kept at 90° C. and 120° C., respectively. The times required for the polymerization in the former and latter zones are very short, and they are 11.8 minutes and 5.0 minutes, respectively.

The resulting product is a plate-like, transparent polymethyl methacrylate article having a thickness of about 3 mm and includes no foams. The product has the following properties: a reduced viscosity of 1.75 dl/g, a residual monomer content of 1.10%, and a heat distortion temperature of 101° C. with no foaming by heating.

EXAMPLE 6

Twenty-five percent of methacrylic resin (Sumipex-B MH, a registered trade mark of Sumitomo Chemical Co., Ltd.) is dissolved in methyl methacrylate to obtain a syrup having a viscosity of 10 poises at 25° C. A suitable amount of ethyl acrylate or methyl acrylate is then added thereto. Bis(4-tert-butylcyclohexyl) peroxydicarbonate is then dissolved in the resulting syrup in an amount as shown in Table 4 (expressed in part by mole based on 100 parts by weight of the syrup), followed by deaeration under reduced pressure. The deaerated syrup is supplied to the equipment as used in Example 1, and polymerization is carried out by driving the moving belts at various speeds as shown in Table 4, during which the hot-water polymerization zone and heat treatment zone are kept at 85° C. and 125° C., respectively. The results are shown in Table 4. The times required for the polymerization in the former and latter zones are very short, as shown in Table 4.

The resulting products are a plate-like, transparent polymethyl methacrylate article having a thickness of about 3 mm and no foaming occurs during polymerization irrespective of the short polymerization time. Further, they produce no foaming by heating.

residual monomer content of 0.86%, and a heat distortion temperature of 103° C. with no foaming by heating.

EXAMPLE 3

Methyl methacrylate containing 5% of ethyl acrylate is added to the polymerization reactor as used in Example 4, and 0.08% of 2,2'-azobis(2,4-dimethylvaleronitrile) is added thereto at 90° C. The mixture is polymerized under reflux to obtain a syrup having a viscosity of 20 poises at 25° C. and a polymer content of 25%. In the syrup is dissolved 0.3% of bis(4-tert-butylcyclohexyl) peroxydicarbonate (the resulting syrup contains said peroxydicarbonate of $0.75 \times 10^{-3}$ part by mole based on 100 parts by weight of the syrup), followed by deaeration under reduced pressure. The deaerated syrup is supplied to the equipment as used in Example 1, and polymerization is carried out by driving the moving belts at various speeds, during which the hot-water polymerization zone and heat treatment zone are kept at 85° C. and 125° C., respectively. The results are shown in Table 5.

Table 5

| Speed of belt (mm/min) | Hot-water polymerization zone (min) | Heat treatment zone (min) | Reduced viscosity (dl/g) | Residual monomer (%) | Heat distortion temperature (°C.) |
| --- | --- | --- | --- | --- | --- |
| 734 | 8.5 | 3.6 | 1.23 | 0.54 | 96 |
| 534 | 11.7 | 5.0 | 1.23 | 0.36 | 97 |

The resulting products are a plate-like, transparent polymethyl methacrylate article having a thickness of about 3 mm and includes no foams. Further, they pro- Table 4

| Amount of ethyl acrylate or methyl acrylate in syrup (%) | | Bis(4-tert-butylcyclohexyl) peroxydicarbonate | | Speed of belt (mm/min) | Hot-water polymerization zone Time (min) | Heat treatment zone Time (min) | Reduced viscosity (dl/g) | Residual monomer (%) | Heat distortion temperature (°C.) |
| --- | --- | --- | --- | --- | --- | --- | --- | --- | --- |
| | | (%) | Part by mole based on 100 parts by weight of syrup | | | | | | |
| Ethyl acrylate | 1 | 0.2 | $0.50 \times 10^{-3}$ | 594 | 10.5 | 4.5 | 1.50 | 0.93 | 101 |
| | 5 | 0.2 | " | " | " | " | " | 0.50 | 97 |
| | 9 | 0.2 | " | " | " | " | " | 0.48 | 89 |
| Methyl acrylate | 3 | 0.3 | $0.75 \times 10^{-3}$ | 693 | 9.0 | 3.9 | 1.15 | 0.65 | 100 |
| | 7 | 0.3 | " | " | " | " | " | 0.50 | 96 |

EXAMPLE 7

In the syrup obtained in Example 4 (syrup No. 4-2) are dissolved 0.06% of lauroyl peroxide and 0.1% of bis(4-tert-butylcyclohexyl) peroxydicarbonate (the resulting syrup contains said peroxydicarbonate of $0.25 \times 10^{-3}$ part by mole based on 100 parts by weight of the syrup), followed by deaeration under reduced pressure. The deaerated syrup is supplied to the equipment as used in Example 1, and polymerization is carried out by driving the moving belts at a speed of 543 mm/min during which the hot-water polymerization zone and heat treatment zone are kept at 90° C. and 120° C., respectively. The polymerization times in the former and latter zones are very short, and they are 11.5 minutes and 4.9 minutes, respectively.

The resulting product is a plate-like, transparent polymethyl methacrylate article having a thickness of about 3 mm and includes no foams. The product has the following properties: a reduced viscosity of 2.05 dl/g, a duce no foaming by heating. It is apparent from Table 5 that no problems of quality occur even though the polymerization time is shortened.

EXAMPLE 9

Twenty-five percent of methacrylic resin (Sumipex-B MH, a registered trade mark of Sumitomo Chemical Co., Ltd.) is dissolved in methyl methacrylate, and 3% of ethyl acrylate is then added thereto to obtain a syrup. A suitable amount of bis(4-tert-butylcyclohexyl) peroxydicarbonate is dissolved in the syrup, followed by deaeration under reduced pressure. The deaerated syrup is supplied to the equipment as used in Example 1, in which the distance between the belts in the zone A-B is adjusted so as to produce a plate-like polymer article having a thickness of 4 mm. Polymerization is carried out by driving the moving belts at various speeds and by changing the temperature of the hot-water polymerization zone and heat treatment zone. The results are shown in Table 6.

The resulting products are a plate-like, transparent polymethyl methacrylate article having a thickness of about 4 mm, and no foaming occurs during polymerization in a short polymerization time, though the thickness becomes larger. Further, they produce no foaming by heating.

temperature of 102° C. with no foaming by heating, an no change is observed on the surface even when the product is exposed to ethyl acetate vapor for 1 hour.

EXAMPLE 12

In the syrup obtained in Example 5 are dissolved 0.03% of lauroyl peroxide and 0.14% of a 50% dibutyl phthalate solution of di-sec-butyl peroxydicarbonate (the resulting syrup contains said peroxydicarbonate of $0.30 \times 10^{-3}$ part by mole based on 100 parts by weight of the syrup), followed by deaeration under reduced pressure. The deaerated syrup is supplied to the equipment as used in Example 1, in which the distance between the moving belts is adjusted so as to produce a plate-like polymer article having a thickness of 5 mm. Polymerization is carried out by driving the moving belts at a speed of 297 mm/min, during which the hot-water polymerization zone and heat treatment zone are kept at 75° C. and 130° C., respectively.

The resulting product is a plate-like, transparent polymethyl methacrylate article having a thickness of about 5 mm and includes no foams. The product has the following properties: a reduced viscosity of 1.79 dl/g, a residual monomer content of 0.60%, and a heat distortion temperature of 103° C. with no foaming by heating.

EXAMPLE 13

In the syrup obtained in Example 5 is dissolved 0.18% of a 50% dibutyl phthalate solution of di-sec-butyl peroxydicarbonate (the resulting syrup contains said peroxydicarbonate of $0.38 \times 10^{-3}$ part by mole based on 100 parts by weight of the syrup), followed by deaeration under reduced pressure. The deaerated syrup is supplied to the equipment as used in Example 1, in which the distance between the moving belts is adjusted so as to produce a plate-like polymer article having a thickness of 5 mm, and polymerization is carried out by driving the moving belts at a speed of 271 mm/min, during which the hot-water polymerization zone and heat treatment zone are kept at 70° C. and 120° C., respectively.

Table 6

| Bis(4-tert-butyl-cyclohexyl) per-oxydicarbonate | | Speed of belt (mm/min) | Hot-water polymerization zone | | Heat treatment zone | | Reduced viscosity (dl/g) | Residual monomer (%) | Heat distortion temperature (°C.) |
|---|---|---|---|---|---|---|---|---|---|
| Part by mole based on 100 parts by weight of syrup (%) | | | Temp. (°C.) | Time (min) | Temp. (°C.) | Time (min) | | | |
| 0.15 | $0.38 \times 10^{-3}$ | 430 | 80 | 14.5 | 120 | 6.2 | 1.76 | 0.63 | 99 |
| 0.3 | $0.75 \times 10^{-3}$ | 664 | 85 | 9.4 | 130 | 4.0 | 1.13 | 0.98 | 97 |
| 0.5 | $1.26 \times 10^{-3}$ | 589 | 75 | 10.6 | 125 | 4.5 | 0.86 | 0.88 | 97 |

EXAMPLE 10

A suitable amount of bis(4-tert-butylcyclohexyl) peroxydicarbonate is dissolved in the syrup obtained in Example 8, followed by deaeration under reduced pressure. The deaerated syrup is supplied to the equipment as used in Example 1, in which the distance between the belts in the zone A-B is adjusted so as to produce a plate-like polymer article having a thickness of 5 mm. Polymerization is carried out by driving the moving belts at various speeds and by changing the temperature of the hot-water polymerization zone. The results are shown in Table 7.

The resulting products are a plate-like, transparent polymethyl methacrylate article having a thickness of about 5 mm, and no foaming occurs during polymerization, though the thickness becomes larger. Further, they produce no foaming by heating.

Table 7

| Bis(4-tert-butyl-cyclohexyl) per-oxydicarbonate | | Speed of belt (mm/min) | Hot-water polymerization zone | | Heat treatment zone | | Reduced viscosity (dl/g) | Residual monomer (%) | Heat distortion temperature (°C.) |
|---|---|---|---|---|---|---|---|---|---|
| Part by mole based on 100 parts by weight of syrup (%) | | | Temp. (°C.) | Time (min) | Temp. (°C.) | Time (min) | | | |
| 0.2 | $0.50 \times 10^{-3}$ | 322 | 70 | 19.4 | 120 | 8.3 | 1.60 | 0.64 | 95 |
| 0.3 | $0.75 \times 10^{-3}$ | 286 | 65 | 21.8 | 120 | 9.3 | 1.55 | 0.66 | 95 |

EXAMPLE 11

In the syrup obtained in Example 5 is dissolved 0.12% of a 50% dibutyl phthalate solution of di-sec-butyl peroxydicarbonate (the resulting syrup contains said peroxydicarbonate of $0.26 \times 10^{-3}$ part by mole based on 100 parts by weight of the syrup), followed by deaeration under reduced pressure. The deaerated syrup is supplied to the equipment as used in Example 1, and polymerization is carried out by driving the moving belts at a speed of 378 mm/min, during which the hot-water polymerization zone and heat treatment zone are kept at 85° C. and 120° C., respectively. The polymerization times in the former and latter zones are 16.5 minutes and 7.1 minutes, respectively.

The resulting product is a plate-like, transparent polymethyl methacrylate article having a thickness of about 3 mm and includes no foams. The product has the following properties: a reduced viscosity of 2.39 dl/g, a residual monomer content of 1.22%, a heat distortion The resulting product is a plate-like, transparent polymethyl methacrylate article having a thickness of about 5 mm and includes no foams. The product has the following properties: a reduced viscosity of 1.61 dl/g, a residual monomer content of 0.55%, and a heat distortion temperature of 103° C. with no foaming by heating.

EXAMPLE 14

In the syrup obtained in Example 4 (Syrup No. 4-2) is dissolved 0.14% of a 50% toluene solution of diisobutyl peroxydicarbonate (the resulting syrup contains said peroxydicarbonate of $0.30 \times 10^{-3}$ part by mole based on 100 parts by weight of the syrup), followed by deaeration under reduced pressure. The deaerated syrup is supplied to the equipment as used in Example 1, and polymerization is carried out by driving the moving belts at a speed of 520 mm/min, during which the hot-water polymerization zone and heat treatment zone are kept at 85° C. and 130° C., respectively. The polymerization times in the former and latter zones are 12 minutes and 5.13 minutes, respectively.

The resulting product is a plate-like, transparent polymethyl methacrylate article having a thickness of about 3 mm and includes no foams. The product has the following properties: a residual monomer content of 1.06%, a heat distortion temperature of 101° C. with no foaming by heating and no change is observed on the surface even when the product is exposed to ethyl acetate vapor for 1 hour.

EXAMPLE 15

In the syrup obtained in Example 4 (Syrup No. 4-3) is dissolved 0.52% of a 50% dioctyl phthalate solution of di-2-ethylhexyl peroxydicarbonate (the resulting syrup contains said peroxydicarbonate of $0.75 \times 10^3$ part by mole based on 100 parts by weight of the syrup), followed by deaeration under reduced pressure. The deaerated syrup is supplied to the equipment as used in Example 1, and polymerization is carried out by driving the moving belts at a speed of 780 mm/min, during which the hot-water polymerization zone and heat treatment zone are kept at 85° C. and 130° C., respectively. The polymerization times in the former and latter zones are 8 minutes and 3.42 minutes, respectively.

The resulting product is a plate-like, transparent polymethyl methacrylate article having a thickness of about 3 mm and includes no foams. The product has the following properties: a reduced viscosity of 1.50 dl/g, a residual monomer content of 0.66%, a heat distortion temperature of 95° C. with no foaming by heating, and no change is observed on the surface even when the product is exposed to ethyl acetate vapor for 1 hour.

EXAMPLE 16

27.5% of methacrylic resin (Sumipex-B MH, a registered trade mark of Sumitomo Chemical Co., Ltd.) is dissolved in methyl methacrylate. A suitable amount of a 50% toluene solution of di-iso-butyl peroxydicarbonate is then dissolved therein, followed by deaeration under reduced pressure. The deaerated syrup is supplied to the equipment as used in Example 1, and polymerization is carried out by driving the belts at various speeds and by changing the temperature of the hot-water polymerization zone and heat treatment zone. The results are shown in Table 8.

The resulting products are a plate-like, transparent polymethyl methacrylate article having a thickness of about 3 mm and includes no foams. Further, they produce no foaming by heating.

Table 8

| 50% Toluene solution of di-isobutyl peroxydicarbonate | | Speed of belt (mm/min) | Hot-water polymerization zone | | Heat treatment zone | | Reduced viscosity (dl/g) | Residual monomer (%) | Heat distortion temperature (°C.) |
|---|---|---|---|---|---|---|---|---|---|
| (%) | Part by mole based on 100 parts by weight of syrup | | Temp. | Time | Temp. | Time | | | |
| 0.18 | $0.38 \times 10^{-3}$ | 520 | 85 | 12 | 135 | 5.1 | 1.99 | 1.17 | 99 |
| 0.16 | $0.34 \times 10^{-3}$ | 416 | 80 | 15 | 130 | 6.4 | 2.10 | 0.79 | 101 |
| 0.15 | $0.32 \times 10^{-3}$ | 347 | 75 | 18 | 120 | 7.7 | 2.45 | 0.45 | 103 |

Reference Example 1

A suitable amount of lauroyl peroxide is dissolved in the syrup obtained in Example 8, followed by deaeration under reduced pressure. The deaerated syrup is supplied to the equipment as used in Example 1, and polymerization is carried out by driving the belts at various speeds, during which the hot-water polymerization zone and heat treatment zone are kept at 80° C. and 120° C., respectively. Thus, platelike polymer articles having a thickness of about 3 mm as shown in Table 9 are obtained.

As is clear from Table 9, when the polymerization is carried out in a short period of time using lauroyl peroxide as an initiator, foaming during polymerization appears more distinctly as the polymerization time becomes shorter, and foaming by heating also appears in either case.

Table 9

| Lauroyl peroxide (%) | Speed of belt (mm/min) | Hot-water polymerization zone (min) | Heat treatment zone (min) | Reduced viscosity (dl/g) | Residual monomer (%) | Heat distortion temperature (°C.) | Foaming during polymerization | Foaming by heating |
|---|---|---|---|---|---|---|---|---|
| 1.0 | 347 | 18.0 | 7.7 | 1.52 | 0.40 | 97 | Not observed | Observed |
| 2.0 | 446 | 14.0 | 6.0 | 0.95 | 0.55 | 96 | Observed | Observed |

Reference Example 2

A suitable amount of 2,2'-azobis(2,4-dimethylvaleronitrile) is dissolved in the syrup obtained in Example 4 (Syrup No. 4-1), followed by deaeration under reduced pressure. The deaerated syrup is supplied to the equipment as used in Example 1, and polymerization is carried out by driving the moving belts at various speeds, during which the hot-water polymerization zone and heat treatment zone are kept at 80° C. and 120° C., respectively. Thus, platelike polymer articles having a thickness of about 3 mm as shown in Table 10 are obtained.

As is clear from Table 10, when the polymerization is carried out in a short period of time using 2,2'-azobis(2,4-dimethylvaleronitrile) as an initiator, foaming during polymerization appears more distinctly as the polymerization time becomes shorter, and foaming by heating also appears in either case.

Table 10

| 2,2'-Azobis(2,4-dimethylvaleronitrile) (%) | Speed of belt (mm/min) | Hot-water polymerization zone (min) | Heat treatment zone (min) | Reduced viscosity (dl/g) | Residual monomer (%) | Heat distortion temperature (°C.) | Foaming during polymerization | Foaming by heating |
|---|---|---|---|---|---|---|---|---|
| 0.1 | 347 | 18.0 | 7.7 | 1.75 | 0.31 | 101 | Not observed | Observed |
| 0.2 | 446 | 14.0 | 6.0 | 1.25 | 0.32 | 102 | Observed | Observed |

Reference Example 3

Twenty-five percent of methacrylic resin (Sumipex-B MH, a registered trade mark of Sumitomo Chemical Co., Ltd.) is dissolved in methyl methacrylate, and 3% of methyl acrylate is added thereto to obtain a syrup. Bis(4-tert-butylcyclohexyl) peroxydicarbonate is dissolved in the syrup, followed by deaeration under reduced pressure. The deaerated syrup is supplied to the equipment as used in Example 1, and polymerization is carried out at various temperatures of the hot-water polymerization zone and heat treatment zone. Thus, plate-like polymer articles having a thickness of about 3 mm as shown in Table 11 are obtained.

As is clear from Table 11, when the amount of initiator exceeds the range of the present invention, the polymerization time is shortened so much that foaming during polymerization does not occur, but foaming by heating appears.

On the other hand, even though the amount of initiator is within the proper range, foaming during polymerization occurs and at the same time the polymerization becomes incomplete to result in a great increase of residual monomer content when the temperature of the hot-water polymerization zone exceeds the range of the present invention.

Table 11

| Bis(4-tert-butylcyclohexyl) peroxydicarbonate | | Speed of Belt (mm/min) | Hot-water polymerization zone | | Heat treatment zone | | Reduced viscosity (dl/g) | Residual monomer (%) | Foaming during polymerization | Foaming by heating |
|---|---|---|---|---|---|---|---|---|---|---|
| (%) | Part by mole based on 100 parts by weight of syrup | | Temp. (°C.) | Time (min) | Temp. (°C.) | Time (min) | | | | |
| 0.65 | $1.63 \times 10^{-3}$ | 990 | 85 | 6.3 | 130 | 2.7 | 0.72 | 0.50 | Not observed | Observed |
| 0.65 | " | 567 | 70 | 11.0 | 120 | 4.7 | 0.98 | 0.30 | Not observed | Observed |
| 0.15 | $0.38 \times 10^{-3}$ | 480 | 98 | 13.0 | 120 | 5.6 | 1.65 | 6.0 | Observed | — |

Reference Example 4

Twenty-five percent of methacrylic resin (Sumipex-B MH, a registered trade mark of Sumitomo Chemical Co., Ltd.) is dissolved in methyl methacrylate to obtain a syrup. Bis(4-tert-butylcyclohexyl) peroxydicarbonate is then dissolved in the syrup, followed by deaeration under reduced pressure. The deaerated syrup is supplied to the equipment as used in Example 1, and polymerization is carried out at various temperatures of the hot-water polymerization zone, during which the speed of the moving belts is controlled so as to produce no foaming during polymerization. The results are shown in Table 12.

The resulting products are a plate-like polymethyl methacrylate article having a thickness of about 3 mm, and shows neither foaming during polymerization nor foaming by heating. However, as is clear from Table 12, when the amount of the initiator is below the range of the present invention, or when the temperature of the hot-water polymerization zone is below the range of the present invention even though said amount is within the proper range, the polymerization time becomes longer, which results unfavorably in a lower productivity.

Table 12

| Bis(4-tert-butylcyclohexyl) peroxydicarbonate | | Speed of belt (mm/min) | Hot-water polymerization zone | | Heat treatment zone | | Reduced viscosity (dl/g) | Residual monomer (%) | Heat distortion temperature (°C.) |
|---|---|---|---|---|---|---|---|---|---|
| (%) | Part by mole based on 100 parts by weight of syrup | | Temp. (°C.) | Time (min) | Temp. (°C.) | Time (min) | | | |
| 0.02 | $0.05 \times 10^{-3}$ | 155 | 70 | 40.3 | 120 | 17.8 | 4.39 | 0.93 | 103 |

Table 12-continued

| Bis(4-tert-butyl-cyclohexyl) per-oxydicarbonate Part by mole based on 100 parts by weight of syrup (%) | Speed of belt (mm/min) | Hot-water polymerization zone Temp. (°C.) | Hot-water polymerization zone Time (min) | Heat treatment zone Temp. (°C.) | Heat treatment zone Time (min) | Reduced viscosity (dl/g) | Residual monomer (%) | Heat distortion temperature (°C.) |
| --- | --- | --- | --- | --- | --- | --- | --- | --- |
| 0.3 | $0.75 \times 10^{-3}$ | 194 | 55 | 32.1 | 120 | 14.2 | 3.46 | 0.92 | 103 |

Reference Example 5

A mixture of methyl methacrylate and 0.001% of azobisisobutyronitrile is polymerized at 80° C. to obtain a syrup having a viscosity of 2 poises at 25° C. and a polymer content of 8.4%. In the syrup is dissolved 0.23% of a 50% dibutyl phthalate solution of di-sec-butyl peroxydicarbonate (the resulting syrup contains said peroxydicarbonate of $0.49 \times 10^{-3}$ part by mole based on 100 parts by weight of the syrup), followed by deaeration under reduced pressure. The deaerated syrup is supplied to the equipment as used in example 1, and polymerization is carried out by driving the belts at a speed of 312 mm/min, during which the hot-water polymerization zone and heat treatment zone are kept at 85° C. and 130° C., respectively.

In the polymerization, the polymerization times in the former and latter zones are very long, and they are 20 minutes and 8.6 minutes, respectively. Nevertheless, the polymerization in the former zone does not proceed sufficiently, so that foaming occurs in the latter zone. Thus, a plate-like polymer article having a thickness of about 3 mm is not obtained successfully.

Reference Example 6

In the syrup obtained in Example 5 is dissolved 0.94% of a 50% dibutyl phthalate solution of di-sec-butyl peroxydicarbonate (the resulting syrup contains said peroxydicarbonate of $2.01 \times 10^{-3}$ part by mole based on 100 parts by weight of the syrup), followed by deaeration under reduced pressure. The deaerated syrup is supplied to the equipment as used in Example 1, and polymerization is carried out by driving the moving belts at a speed of 780 mm/min, during which the hot-water polymerization zone and heat treatment zone are kept at 85° C. and 130° C., respectively. The polymerization times in the former and latter zones are 8 minutes and 3.4 minutes, respectively.

The resulting product is a plate-like polymethyl methacrylate article having a thickness of about 3 mm and has the following properties: a reduced viscosity of 0.66 dl/g, a residual monomer content of 1.17%, and a heat distortion point of 103° C. The product includes no foams by polymerization but produces foaming by heating.

Reference Example 7

In the syrup obtained in Example 5 is dissolved 0.47% of a 50% dibutyl phthalate solution of di-sec-butyl peroxydicarbonate (the resulting syrup contains said peroxydicarbonate of $1.00 \times 10^{-3}$ part by mole based on 100 parts by weight of the syrup), followed by deaeration under reduced pressure. The deaerated syrup is supplied to the equipment as used in Example 1, and polymerization is carried out by driving the moving belts at a speed of 312 mm/min, during which the hot-water polymerization zone and heat treatment zone are kept at 55° C. and 130° C., respectively. The polymerization times in the former and latter zones are long, such as 20 minutes and 8.6 minutes, respectively. Nevertheless, the polymerization in the former zone does not proceed sufficiently, so that foaming occurs in the latter zone and a plate-like polymer article having a thickness of about 3 mm is not obtained successfully.

What is claimed is:

1. A process for the continuous casting of liquid polymerizable compositions, which comprises:
   continuously feeding a liquid polymerizable composition, which is prepared by dissolving a polymerization initiator of the formula:

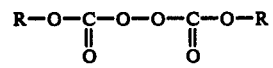

wherein R is an alkyl or alkoxyalkyl group having 4 to 10 carbon atoms, in a syrup of methyl methacrylate having a polymer content of 15 to 35% by weight, into a space enclosed with a pair of upper and lower moving endless belts and continuous gaskets between the belts, both of said belts travelling in the same direction at the same speed and said gaskets being arranged at each side of the belt in opposed relationship and travelling in intimate contact with said belts,
   driving or running the belts through a hot-water polymerization zone, during which the liquid polymerizable composition becomes polymerized, wherein both the amount of the initiator, expressed in parts by mole based on 100 parts by weight of the syrup, and the temperature in °C. of the zone are present within the region enclosed with the straight lines passing successively through the five points in FIG. 1, said points being I ($2 \times 10^{-5}$, 90), II ($1.5 \times 10^{-3}$, 90), III ($1.5 \times 10^{-3}$, 60), IV ($1.8 \times 10^{-4}$, 60) and V ($2 \times 10^{-5}$, 85),
   driving or running the belts through a heat treatment zone, during which the polymerization is completed,
   and then removing the resulting plate-like polymer article at the other end of the moving belts.

2. A process according to claim 1, wherein said polymerization initiator is a member selected from the group consisting of di-n-butyl peroxydicarbonate, di-isobutyl peroxydicarbonate, di-sec-butyl peroxydicarbonate, dicyclohexyl peroxydicarbonate, di-1-ethylhexyl peroxydicarbonate, diethoxyethyl peroxydicarbonate, di-3-methoxybutyl peroxydicarbonate and bis(4-tert-butylcyclohexyl) peroxydicarbonate.

3. A process according to claim 1, wherein the polymerization initiator is a member selected from the group consisting of di-sec-butyl peroxydicarbonate and bis(4-tert-butylcyclohexyl) peroxydicarbonate.

4. A process according to claim 1, wherein said syrup has a viscosity of 5 to 100 poises at 25° C.

5. A process according to claim 1, wherein said polymerization initiator is used together with a different radical initiator.

6. A process according to claim 5, wherein said different radical initiator is used in an amount of $2\times 10^{-4}$ part by mole or less based on 100 parts by weight of the syrup.

7. A process according to claim 5, wherein said different radical initiator is lauoryl peroxide or tert-butyl peroxypivalate.

8. A process according to claim 1, wherein said syrup contains a $C_1$–$C_8$ alkyl ester of acrylic acid.

9. A process according to claim 8, wherein said $C_1$–$C_8$ alkyl ester of acrylic acid is a member selected from the group consisting of methyl acrylate, ethyl acrylate, n-propyl acrylate, isopropyl acrylate, n-butyl acrylate, isobutyl acrylate, sec-butyl acrylate, tert-butyl acrylate, hexyl acrylate, cyclohexyl acrylate, 2-ethylhexyl acrylate and octyl acrylate.

10. A process according to claim 1, wherein the temperature of said heat treatment zone is in the range of 110° to 150° C.

11. A process according to claim 9, wherein the content of said $C_1$–$C_8$ alkyl ester of acrylic acid in the syrup is 0.5 to 15% by weight.

12. A process according to claim 1, wherein the polymer content of the syrup of methyl methacrylate is 20 to 30% by weight.

* * * * *